United States Patent [19]
Mower et al.

[11] Patent Number: 5,204,875
[45] Date of Patent: Apr. 20, 1993

[54] 4-ARY CORRELATOR, MATCHED FILTER, AND DECODER FOR COHERENT, DIRECT SEQUENCE, SPREAD SPECTRUM APPLICATIONS

[75] Inventors: Vaughn L. Mower, Bountiful; Merle L. Keller, Salt Lake City, both of Utah

[73] Assignee: The United States of America as represented by the Secretary of the Air Force, Washington, D.C.

[21] Appl. No.: 728,906

[22] Filed: Jul. 9, 1991

[51] Int. Cl.⁵ .............................. H04K 1/00
[52] U.S. Cl. .......................... 375/1; 380/34; 370/18
[58] Field of Search .............. 375/1, 53, 54, 84, 85, 375/86, 87; 370/18, 19, 20, 21, 22; 380/34

[56] References Cited

U.S. PATENT DOCUMENTS

| | | | |
|---|---|---|---|
| 3,478,268 | 11/1969 | Coviello | 375/1 |
| 3,916,313 | 10/1975 | Lowry | 325/30 |
| 4,017,798 | 4/1977 | Gordy et al. | 325/42 |
| 4,635,221 | 1/1987 | Kerr | 375/1 X |
| 4,691,326 | 9/1987 | Tsuchiya | 375/1 |
| 4,866,734 | 9/1989 | Akazawa et al. | 375/1 |
| 4,933,952 | 6/1990 | Albrieux et al. | 375/1 |
| 4,943,975 | 7/1990 | Kurihara et al. | 375/1 |

FOREIGN PATENT DOCUMENTS

2188517 9/1987 United Kingdom ................ 375/1

*Primary Examiner*—Tod Swann
*Attorney, Agent, or Firm*—Irwin P. Garfinkle; Donald J. Singer

[57] ABSTRACT

A system for decoding an IF signal modulated with 4-ary words generated at a known spreading rate (PN code) comprises a receiver in which four known 4-ary words are generated at the same rate. The system then compares the incoming signals modulated with unknown 4-ary words with each of four known 4-ary words. Only one of the known words will be in phase with a received unknown word. The disclosure describes a system which determines which of the four words is in phase, this being the determinant of the identity of the unknown word.

6 Claims, 7 Drawing Sheets

RESULTING 4 SYMBOL WORD

SYMBOL POSITION 1 2 3 4

FIG. 1

SPREAD SPECTRUM IF DESPREAD AND SYSTEM TIMING

BASEBAND CORRELATION COLUMN NUMBER

| | (MIXER 12) 95 | (MIXER 13) 96 | (MIXER 14) 97 | (MIXER 15) 98 | |
|---|---|---|---|---|---|
| ROW | | | | | |
| 100 | ⊓__ | ⊓__ | ⊓__ | ⊓__ | RECEIVED WORD |
| 101 | ⊓__ | _⊓_ | __⊓_ | ___⊓ | LOCAL WORDS |
| 102 | ____ | ⊓⊓_ | ⊓_⊓ | ⊓_⊓ | MIXER OUTPUT |
| 103 | _⊓_ | _⊓_ | _⊓_ | _⊓_ | RECEIVED WORD |
| 104 | ⊓__ | _⊓_ | __⊓_ | ___⊓ | LOCAL WORDS |
| 105 | ⊓_⊓ | ____ | ⊔⊓⊔ | ⊔⊓⊓ | MIXER OUTPUT |
| 106 | __⊓_ | __⊓_ | __⊓_ | __⊓_ | RECEIVED WORD |
| 107 | ⊓__ | _⊓_ | __⊓_ | ___⊓ | LOCAL WORDS |
| 108 | ⊓⊓⊔ | ⊔⊓⊔ | ____ | ⊔_⊓ | MIXER OUTPUT |
| 109 | ___⊓ | ___⊓ | ___⊓ | ___⊓ | RECEIVED WORD |
| 110 | ⊓__ | _⊓_ | __⊓_ | ___⊓ | LOCAL WORDS |
| 111 | ⊓_⊓ | ⊔⊓⊓ | ⊔_⊓ | ____ | MIXER OUTPUT |

112 INDICATION OF CORRECT WAVEFORM..⊔____⊔

SYSTID SIMULATION
EYE PATTERNS

FIG. 18

PROBABILITY OF BIT ERROR
SYSTID SIMULATION

FIG. 19

4-ARY CORRELATOR, MATCHED FILTER, AND DECODER FOR COHERENT, DIRECT SEQUENCE, SPREAD SPECTRUM APPLICATIONS

STATEMENT OF GOVERNMENT INTEREST

The invention described herein may be manufactured and used by or for the Government for governmental purposes without the payment of any royalty thereon.

BACKGROUND OF THE INVENTION

Spread spectrum variable data rate coherent phase-shift-keyed communication links offer a powerful trade-off between imagery data rate and jam resistance/low probability of detection (JR/LPD) performance. However, the implementation of such a data link requires considerations of waveform design and synchronization concepts beyond those required for a fixed data rate system. Almost invariably, analyses and studies indicate that the preferred data waveform is one which incorporates a coherent residual carrier component which is used for detection and tracking in the receiver. Such a waveform obviates the multiplicity of data rate dependent filters normally used in receivers which recover the carrier phase by non-linear methods (e.g., nth-power and Costas type designs).

This invention employs coherent BPSK for both pseudorandom noise (PN) and data modulation because of its simplicity and low risk implementation at high rates. The long term balance of "one's" and "zero's" in conventional BPSK modulation ensures the (theoretical) absence of a discrete carrier component in the RF waveform; hence the term "suppressed" carrier. Coherent demodulation of this waveform (suppressed carrier), however, requires a carrier, and the carrier is typically derived from the waveform by non-linear operations in the receiver. Whether the non-linear operation is at IF (e.g. squaring loop) or baseband (e.g., Costas loop) an inevitable loss in signal-to-noise ratio (SNR) results. Under low input predetection SNR's, small signal suppression effects cause system performance to degrade faster than the input SNR; in the cases of the carrier and N code tracking loops, undesirable parameter changes (loop gain, damping and bandwidth) result. In order to minimize precipitous degradation in these loops, data rate dependent filters are required to maintain the predetection SNR as high as possible. In a multi-rate system, a fully optimized suppressed carrier receiver design would require as many different filter bandwidths (whether IF or baseband) as data rates and possibly several different IF frequencies to support all of the bandwidths.

The penalty for not optimizing the performance for each data rate is, as implied above, non-graceful degradation. Loop bandwidths adapt to the rapidly reducing input SNR, quickly becoming too narrow to track the carrier or N code frequency dynamics, and tracking thresholds are reached just a few dB below the operating point for low error rate data recovery.

The motivation for a residual carrier waveform design is the need to avoid the non-linearity losses suffered in multi-bit rate suppressed carrier designs. If the transmitted waveform contained within its structure is a relatively low power coherent carrier, then this carrier would be available immediately in the receiver for detection and tracking; non-linear processes and the attendant performance degradation would be avoided. Such a residual carrier would not be detectable as a discrete line spectrum in the transmitted waveform because it, too, would be spread by the spreading waveform.

If, instead of a long term balance of "one's" and zero's" in the data stream, an unbalance is forced, then the resulting waveform at RF would contain a residual carrier. This is the concept behind a shared energy signal (SES) waveform. However, the unbalance is not created by a simple stuffing of extra "one's" or "zero's", as this would be inefficient, but rather by a unique coding scheme which provides the desired unbalance. The coding is 4-ary, providing a residual carrier 6 dB down.

SUMMARY OF THE INVENTION

In summary, this invention is for decoding a 4-ary transmission in which the identity of each of four possible 4-ary words is established. Decoding is achieved by generating four known words at the receiver at a rate which is identical to the spreading rate of the transmission. The known words are each combined in four mixers with the transmitted words, and a logic system is then utilized to determine which of the four known words corresponds with the unknown words.

BRIEF DESCRIPTION OF THE DRAWINGS

For a better understanding of the nature and objects of the invention, reference should now be made to the following detailed specification and to the accompanying drawings in which.

DESCRIPTION OF THE PREFERRED EMBODIMENT

The nature of the 4-ary waveform and its speed place the greatest demands on spread spectrum variable data rate coherent phase shift keyed (CPSK) demodulator and decoder functions, demands to which this invention responds. This being the case, the 4-ary signal must be described.

Figure 1:
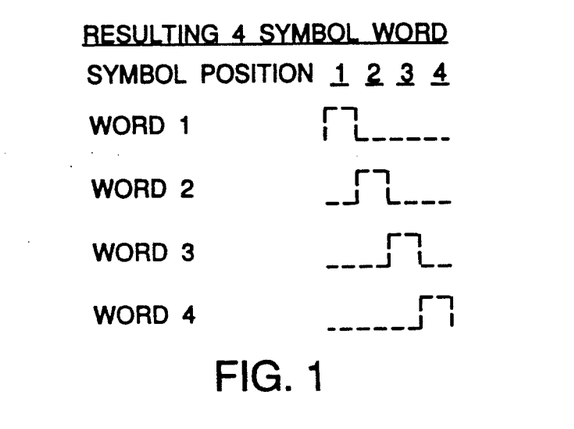
FIG. 1 illustrates the signal mapping of a two bit to 4 symbol word.

The 4-ary signal is the result of a two bit to four symbol mapping as shown in FIG. 1. Since four two-bit words are possible, four four-symbol words are possible. Each of the 4-ary words is comprised of three logic "zero's" and one logic "one." This three-to-one imbalance provides a residual carrier whose signal strength is that of the modulated RF waveform minus 6 dB.

The residual carrier of a 4-ary shared energy signal is not detectable as a discrete line spectrum in the transmitted waveform because in a direct sequence spread spectrum communication link it, too, is spread by the spreading waveform. The spreading waveform has a rate known as the chipping rate, and the spreading waveform has the spectral characteristics of pseudorandom noise (PN); thus, the spreading waveform is known as a N code. The N codes within the invention are generated and managed by a device known as a PN Generator 5. The chipping rate clock is the source of all timing located within the PN Generator. By exploiting the capabilities of epochs and subepochs designed into the spreading N waveform (not disclosed as part of this invention), the position of 4-ary words relative to the spreading waveform is established.

Figure 2:
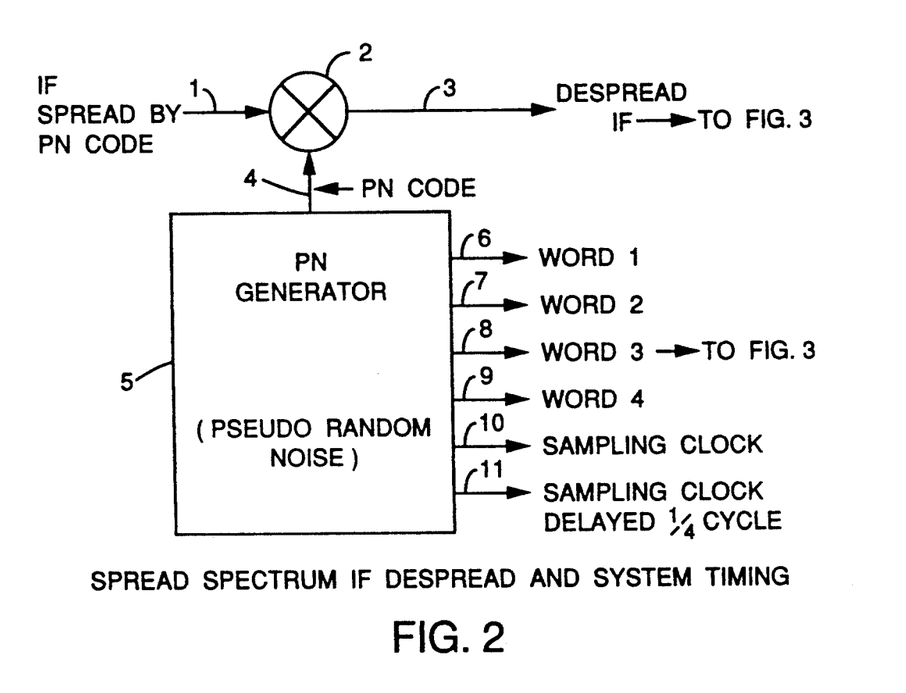
FIG. 2 is a block diagram of the spread spectrum IF despread and system timing.

FIG. 2 depicts the despreading and system timing performed by the PN Generator 5. Synchronization derived from the despreading process provides the coherent clocks and coherent signals needed by the demodulator to accomplish correlation and decoding of the 4-ary signal stream. When within the receiver, the locally generated N code on line 4 is successfully aligned with the received N code, which is part of the received signal on line 1, the waveform on line 3 out of mixer 2 is a despread stream of contiguous 4-ary words modulated onto the carrier IF. Not only does the despreading process remove the N code from the received waveform, but it also aligns the boundaries (transitions) of received 4-ary words with the boundaries of locally generated 4-ary words since the relative position of received 4-ary words to the received N code is the same as the relative position of locally generated 4-ary words to the locally generated N code.

As shown in FIG. 2, the PN Generator generates six waveforms critical to the correlation and decoding functions performed by this invention: contiguously repeated copies of each of the 4-ary words coherently aligned with received 4-ary words on lines 6 through 9, a sampling clock 10, one cycle of which is equal to the length of a 4-ary word on line 10, and another sampling clock 11 identical to clock 10, but delayed by one quarter cycle. Epoch and subepoch capabilities were exploited in order to establish rising edge coincidence of clock 10 with 4-ary word transitions at lines 6 through 9.

With the beginning and end of four-symbol 4-ary words known by the demodulator, it still remains for the demodulator to determine which one of the four 4-ary words resides within each of the 4-ary word periods.

Figure 3:
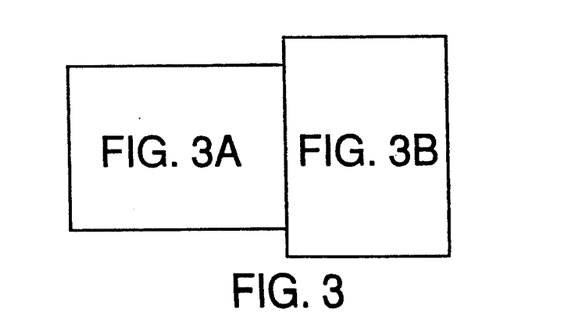
Figure 3A:
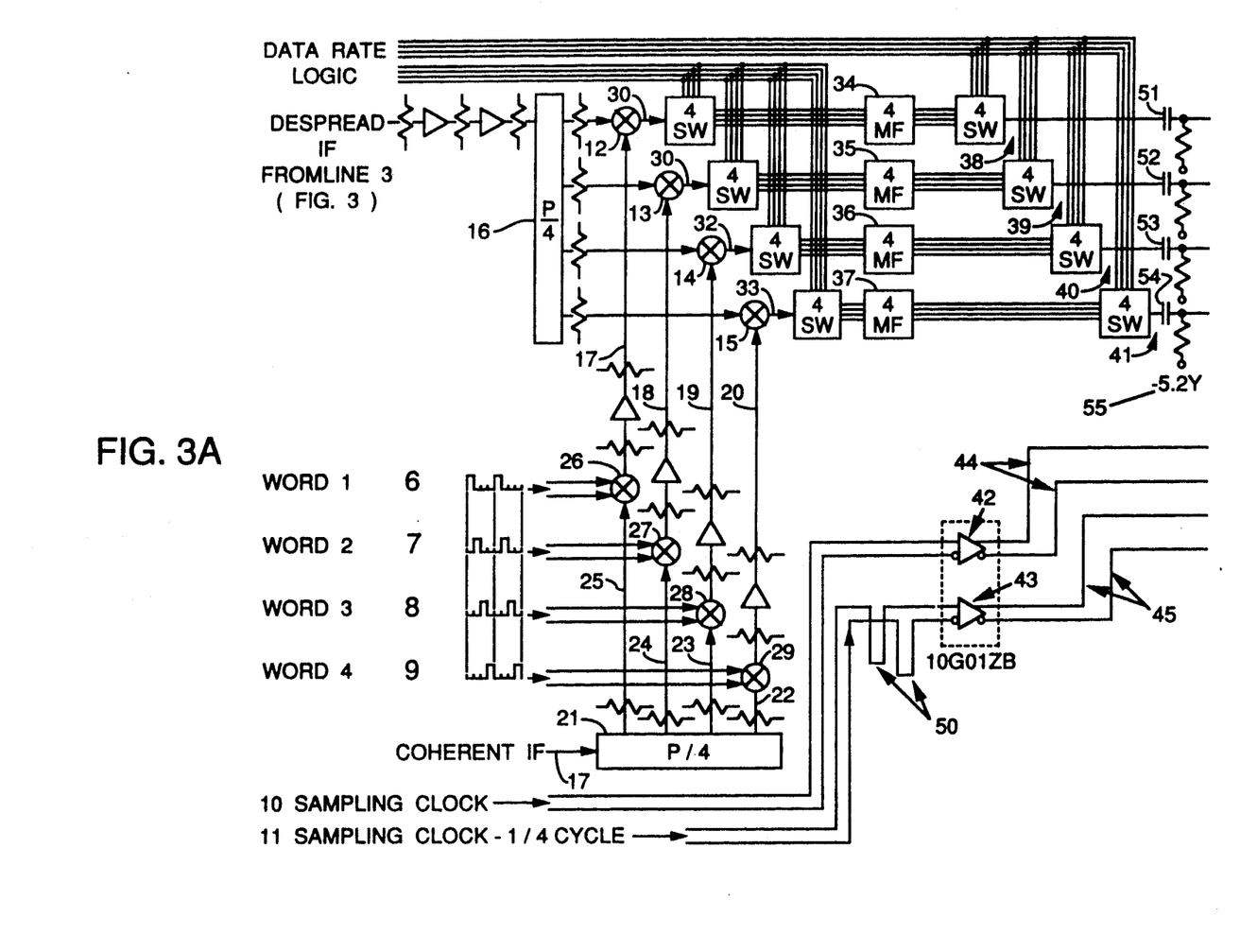
FIGS. 3a and b, combined with FIG. 2, is a simplified block diagram illustrating a preferred embodiment of the invention.
Figure 3B:
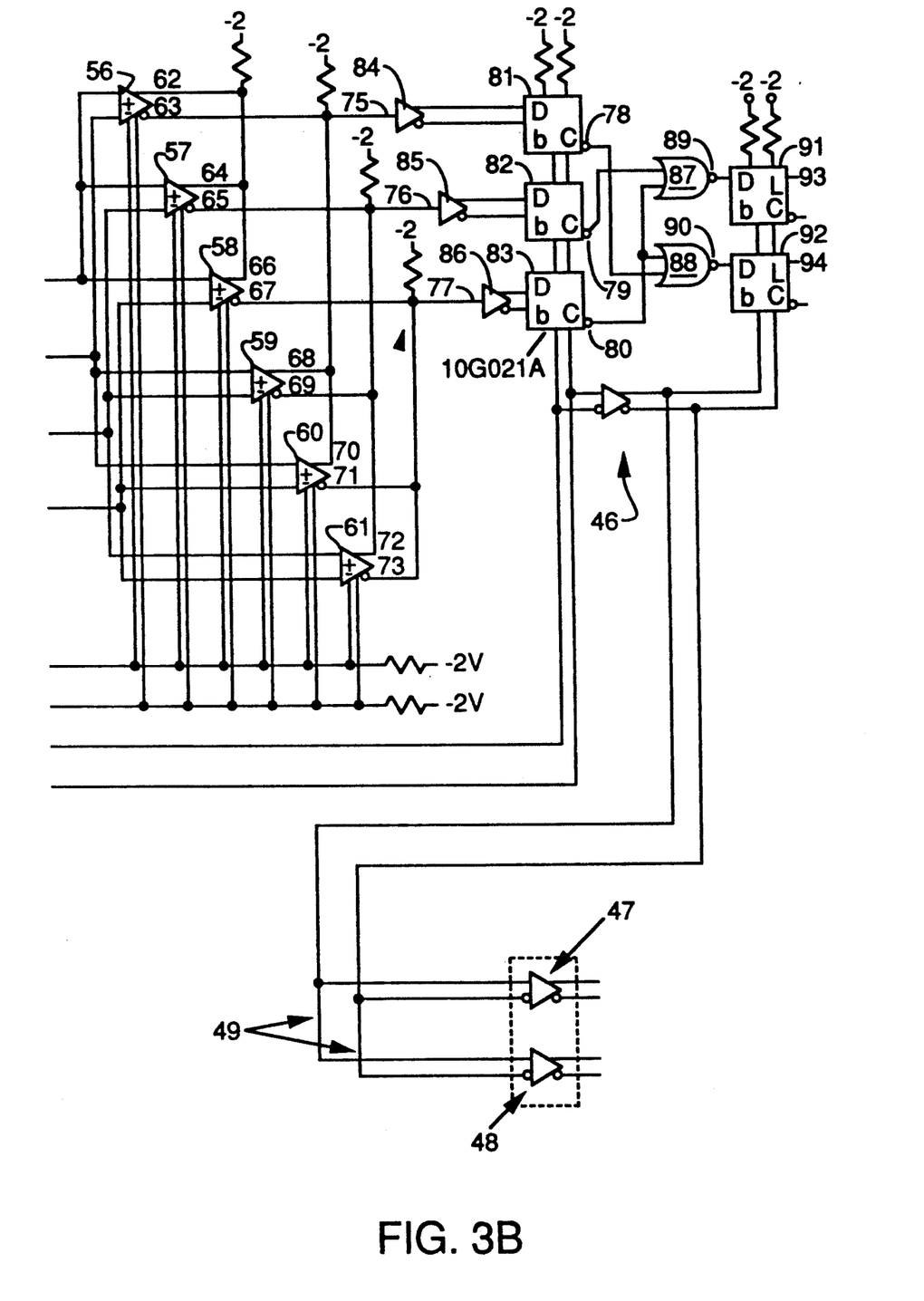

FIG. 3 is a simplified block diagram illustrating the preferred embodiment of the present invention. An intermediate frequency (IF) CPSK modulated by 4-ary words of unknown identity from the output of the mixer 2 at line 3, is introduced into mixers 12 through 15 by means of the four-way power divider 16. A phase and frequency coherent, recovered IF at line 17 is four-way power divided by device 21, providing outputs at lines 22 through 25. The outputs at lines 22 through 25 are CPSK modulated in mixers 29, 28, 27 and 26, respectively, with known continuously repeated contiguous 4-ary words 9, 8, 7, and 6, respectively, transition coherent to 4-ary words impressed from line 3.

If line 3 were modulated in a particular word period by Word 1, line 17 would consist, during that particular word period, of absolutely identical information (assuming perfect timing). During the same particular word period, lines 18, 19, and 20 would contain phase information orthogonal to that found in both lines 3 and 17. If line 3 were modulated in a particular word period by Word 2, line 18 would consist, during that particular word period, of absolutely identical information (assuming perfect timing). During the same particular word period, lines 17, 19, and 20 would contain phase information orthogonal to that found in both lines 3 and 18. Phase information of local and received signals is tabulated in Table 1.

TABLE 1

Phase Information of Local and Received Signals

| Word Modulating Line 3 | Line Containing Information Identical to 3 | Lines Containing Phase Orthogonal Information | | |
|---|---|---|---|---|
| Word 1 | 17 | 18 | 19 | 20 |
| Word 2 | 18 | 17 | 19 | 20 |
| Word 3 | 19 | 17 | 18 | 20 |
| Word 4 | 20 | 17 | 18 | 19 |

When signals contained on lines 17 through 20 are mixed with the signal contained on line 3 in mixers 12 through 15, respectively, two important functions take place. First, down conversion to baseband occurs. The mixing function results in a sum and difference term of the received and local carriers. The sum term is easily filtered, leaving the difference term. Since the two carriers share the identical frequency, the difference term is zero, a dc term. Secondly, phase correlation takes place, and correlation information is contained in the resulting dc outputs. The dc information passed from mixers 12 through 15 to lines 30 through 33, respectively, contains correlation information.

Figure 4:
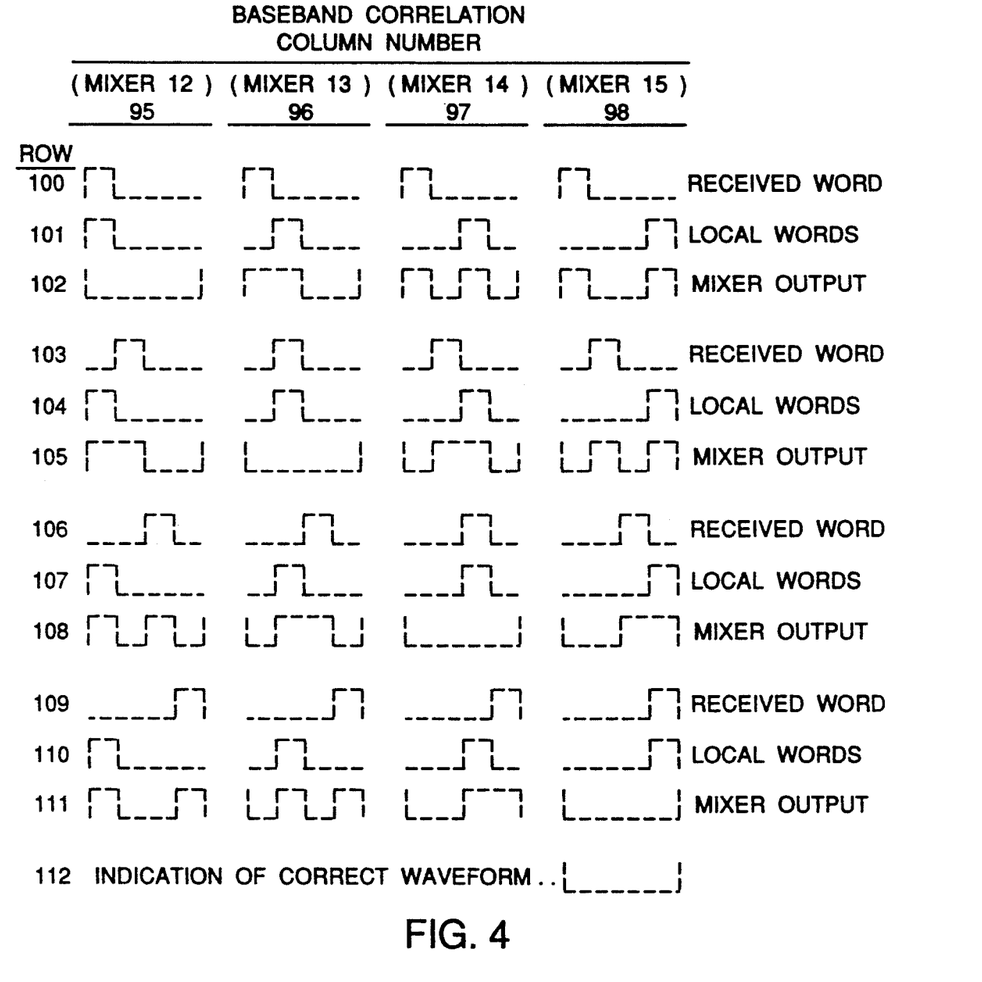
FIG. 4 depicts the various outputs from the mixers 12 to 15 (FIG. 2)
Figure 5:
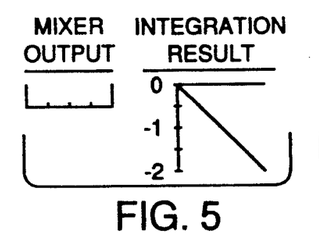
FIGS. 5 through 11 depict the possible integration outcomes of all phase combinations occurring in any given four-symbol period experienced in mixers 12 through 15.
Figure 6:
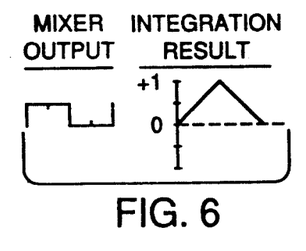
Figure 7:
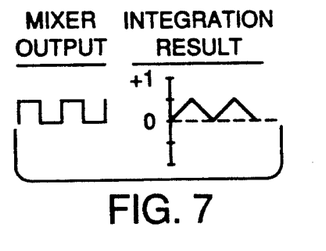
Figure 8:
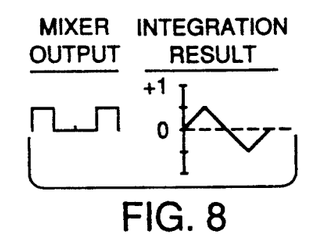
Figure 9:
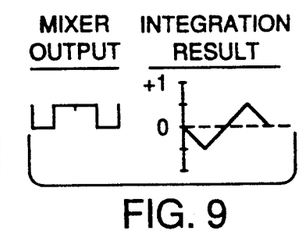
Figure 10:
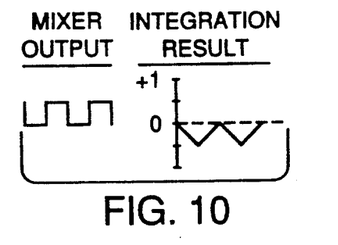
Figure 11:
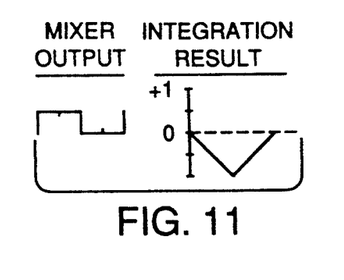
Figure 12:
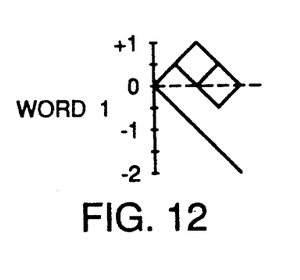
FIGS. 12–16 depict composite outputs commonly referred to as eye patterns.
Figure 13:
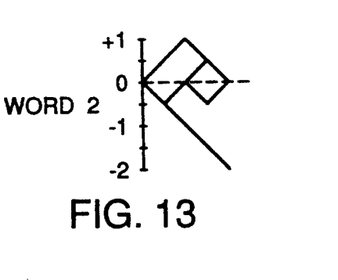
Figure 14:
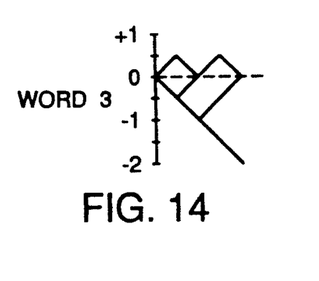
Figure 15:
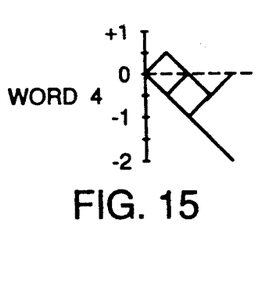

The nature of the dc correlation signals contained on lines 30 through 33 is illustrated in FIG. 4. It should be noted at this point that the IF correlation method of this invention accomplished in mixers 12 through 15 eliminates the need for data-rate dependent correlators or for correlators employing rate-limiting switches. Cost of implementation is reduced and throughput is increased by application of the correlation method of this invention.

If the above-mentioned two critical functions did not occur simultaneously in mixers 12 through 15, it naturally follows that the functions would have to occur separately. If the carrier were removed from the incoming signal on line 3 through a downconversion process, the baseband 4-ary signals would remain to be processed and correlated. Sufficient voltage levels would have to exist in order to process the baseband 4-ary signals through correlators and related logic devices. Amplification would undoubtedly be required since relatively small voltages exist on lines 30 through 33 due to the maximum allowable input voltages and insertion losses of mixers 12 through 15. Group delay is a concomitant penalty with baseband amplification. As such, circuit implementations employing baseband amplifiers restrict data rates to those low enough to accommodate accurate data-to-sampling clock relationships taking into account group delay variations over temperature, primarily through base band amplifiers.

If the signal on line 3 were modulated in a particular word period by word 1, it would contain the phase information depicted on row 100. Line 17 would have, during that particular word period, absolutely identical information (assuming perfect timing) as depicted on line 101, column 95. Lines 18, 19, and 20 would consist of orthogonal phase information as depicted on line 101, columns 96, 97, and 98, respectively. The dc information output from mixers 12, 13, 14, and 15 during each of the word's four symbol periods is depicted in row 102, columns 95, 96, 97, and 98, respectively. Only the output at line 30 of mixer 12 as depicted in row 102, column 95, has the same dc content in all four of the symbol periods. The outputs from mixers 13, 14, and 15, however, have two symbol periods of the mixer's most negative dc voltage and two symbol periods of the mixer's most positive dc voltage. The mixer (chosen from among 12 through 15) whose output during any specific word period consists of four symbol periods of the mixer's most negative output is the mixer whose known local 4-ary word is the same as the received 4-ary word. In this example, the output of mixer 12 reveals that the received unknown 4-ary word is in fact Word 1.

Mixer outputs at lines 30 through 33 of mixers 12 through 15, respectively, are passed through filters 34 through 37, respectively, matched to the data rate being received. Although filters 34 through 37 are really two-pole Butterworth matched filters, it is easier to understand the signal processing that follows filtering if it is assumed for a moment that the filters are integrate-and-dump in character. Examples which follow, involving integrate-and-dump filters, assume that the integrator is fully discharged prior to an integration and that they are fully discharged immediately after an integration. This assumes that there is no intersymbol interference; the energy from one word is not present to influence the integration result of another word. If an integration of lines 30 through 33 (depicted on line 101, columns 95 through 98, respectively) were performed, one word at a time, only line 30 would result in a net dc voltage for an autonomous word period, negative in this case. Lines 31, 32, and 33 would result in an integrated output of zero, having spent as much time (as many symbol periods) positive as negative.

FIG. 4 depicts the various outputs possible from mixers 12 through 15. Outputs of Row 102 have already been discussed. Each column of FIG. 4 represents the phase correlation taking place in a single mixer. Columns 95 through 98 represent the phase correlation taking place in mixers 12 through 15, respectively. No mixer shares the same identical set of output with any other mixer, an aspect of the mixer outputs whose importance will be seen later. As depicted in FIGS. 5 through 11, seven mixer outputs are possible.

FIGS. 5 through 11 depict the possible integration outcomes of all phase combinations occurring in any given four-symbol period experienced in mixers 12 through 15. If a perfect integrator were assumed and if the integrator were fully discharged prior to an integration, integration results as depicted in FIGS. 5 through 11 would take place.

Figure 16:
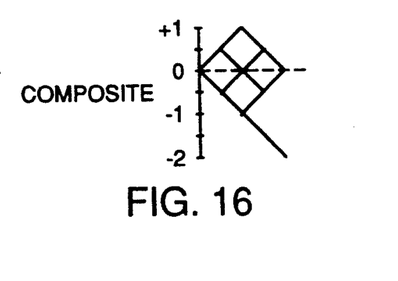

If the integrated outputs, lines 38 through 41 of FIG. 3, of individual word periods from mixers 12 through 15, depicted in integration results of FIGS. 5 through 11, were drawn on top of one another, a composite output unique to each line would result as shown in FIGS. 12 through 15, respectively. These composite outputs are commonly referred to as eye patterns. Each of lines 38 through 41 has a unique eye pattern since each line consists of a unique set of four mixer outputs from the seven outputs possible. FIG. 16 depicts the eye pattern which would result if all eye patterns were superimposed. Although the eye pattern of FIG. 16 appears nowhere in the circuit as do those of FIGS. 12 through 15, it provides instructive insight into the general case of integration results.

Assuming perfect integration in this integrate-and-dump example, only one of two results is possible at the end of a four-symbol integration period. The integration either results in an output of zero volts, or it results in an output of minus 2 units, using the units of FIGS. 5 through 16. No other integration final results are possible. Orthogonality among the 4-ary words guarantees that the outcome of three of the integration will be zero; at the end of a 4-ary word period, three of lines 38 through 41 will have integration results of zero, and one line of lines 38 through 41 will have an integration result of minus 2 units. The line (chosen from among lines 38 through 41) whose output is minus 2 units declares the correct 4-ary word occurring during the tested word period. It is only a matter to compare lines 38 through 41 in order to determine which of the four has the output of minus 2 units.

Figure 17:
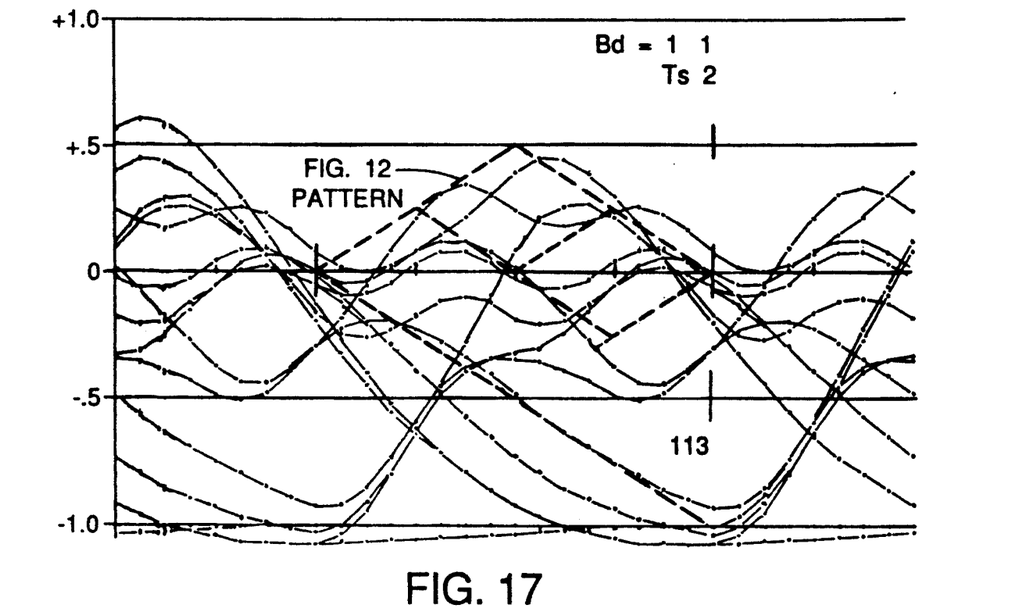
FIG. 17 is a simulation of an eye pattern.

In practice, the matched filtering and output comparison process is not as easy as suggested by the assumed ideal conditions. Integrate-and-dump filters are data-rate-pacing items; switches can only be switched so fast. Using two-pole Butterworth matched filters as filters 34 through 37 allows higher data rates to be processed than are possible with integrate-and-dump filters. Intersymbol interference does distort the clean eye patterns depicted in FIGS. 12 through 15. FIG. 17 is a simulation of an eye pattern, the composite overlay of possible outcomes, occurring at line 38 (compare with FIG. 12). An ideal integrate-and-dump eye pattern (FIG. 12) has been superimposed on the simulated eye pattern in order to demonstrate the effects of intersymbol interference. Comparison of the output must take place at position 113 for each word, the position within the eye pattern where the greatest divergence occurs between a true or an orthogonal result.

Intersymbol interference and noise disallow the use of hard decisions at position 113; intersymbol interference and noise reduce the divergence between true and orthogonal results. Also, dc coupling is disallowed due to voltage offsets from mixers 12 through 15. The signals present on lines 30 through 33 are expected to be of the same magnitude as mixer offsets. Therefore, ac coupling is needed to remove static voltage offsets. Logic family signal compatibility also requires an input voltage dynamic range that is not differential about zero volts. Once again, ac coupling is mandated in order to facilitate a significant offset voltage 55. Capacitors 51 through 54 accomplish the needed ac coupling.

High-speed comparators 56 through 61 determine which output, 38 through 41, has the most negative voltage at position 113 of each word. The PN Generator 5, has a prior knowledge of the location of position 113 within each 4-ary word. Therefore, sampling clock 10 is provided by the PN Generator through line receiver 42. Sampling clock 10 provided by PN Generator 5 signals high-speed comparators 56 through 61 by means of complementary logic lines 44 to sample and evaluate their inputs. Determination of the most negative output follows comparator logic as outlined in table 2.

TABLE 2

| Comparator Logic |
|---|
| If 38 < 39 Then 62 = logic 0 and 63 = Logic 1 |
| If 38 < 40 Then 64 = logic 0 and 65 = Logic 1 |
| If 38 < 41 Then 66 = logic 0 and 67 = Logic 1 |
| If 39 < 38 Then 62 = logic 1 and 63 = Logic 0 |
| If 39 < 40 Then 68 = logic 0 and 69 = Logic 1 |
| If 39 < 41 Then 70 = logic 0 and 71 = Logic 1 |

TABLE 2-continued

| Comparator Logic |
|---|
| If 40 < 38 Then 64 = logic 1 and 65 = Logic 0 |
| If 40 < 39 Then 68 = logic 1 and 69 = Logic 0 |
| If 40 < 41 Then 72 = logic 0 and 73 = Logic 1 |
| If 41 < 38 Then 66 = logic 1 and 67 = Logic 0 |
| If 41 < 39 Then 70 = logic 1 and 71 = Logic 0 |
| If 41 < 40 Then 72 = logic 1 and 73 = Logic 0 |

When line 38 is the most negative, lines 62, 64, and 66 are logic zero. That is the only time when they are simultaneously at logic zero. At any other time, at least one of them is at a logic one. Therefore, when lines 62, 64, and 66 are logic zero as the result of a comparator sample, Word 1 is indicated as the correct 4-ary word received. Following this logic, table 3 is provided.

TABLE 3

| | Combinatorial Logical | |
|---|---|---|
| This is the Correct Received Word | When these Lines are Logic Zero | And wired together Are given this Wired-Or Name |
| Word 1 | 62, 64, 66 | 74 |
| Word 2 | 63, 68, 70 | 75 |
| Word 3 | 65, 69, 72 | 76 |
| Word 4 | 67, 71, 73 | 77 |

Wired-Or 74 is not needed in the combinatorial logic in order to determine that Word 1 has indeed resulted in the most negative output. If the information available at 74 through 77 is known, then by process of elimination, information about Word 1 is known. Wired-Or's 75 through 77 are sent to logic-family-compatible differential line drivers 84 through 86, respectively. The outputs of 84 through 86 are sent to D-Flip Flops (DFF's) 81 through 83, respectively, where outputs of 84 through 86 are reclocked by sampling clock 11 provided by the PN Generator through line receiver 43 and differential line pair 45. The sampling clock used on DFF's 81 through 83 is delayed one forth of the sampling clock used on comparators 56 through 61. The quarter cycle delay facilitates timing requirements and renders the DFF sampling function data-rate independent. Data-rate dependent delay lines would otherwise be required. The information on lines 75 through 77 has become the information on lines 78 through 80, respectively. Short delay 50 facilitates system timing at high data rates, and can be implemented as a cable delay. Delay 50 is transparent at lower data rates.

The 4-ary symbols result as a consequence of a two bit to four symbol mapping. Combinatorial logic is needed to complete the reverse four symbol to two bit mapping. The signals present on lines 78 through 80 are processed through NOR logic devices 87 and 88 in order to complete the four symbol to two bit mapping. Table 4 contains the logic matrix of the mapping.

TABLE 4

| Two Bit to Four Symbol Mapping | | | | |
|---|---|---|---|---|
| Line 78 | Line 79 | Line 80 | Line 89 | Line 90 |
| 0 | 0 | 0 | 1 | 1 |
| 1 | 0 | 0 | 1 | 0 |
| 0 | 1 | 0 | 0 | 1 |
| 0 | 0 | 1 | 0 | 0 |

It can be seen that lines 89 and 90 are exactly inverted from the MSB and LSB bits, respectively, of FIG. 1. Devices 91 and 92, DFF's, not only realign the data bits, but their differential outputs compensate for the logic inversion of lines 89 and 90. Devices 91 and 92, D Flip Flops, are clocked with sampling clock 11, but the clock is buffered through line receiver 46 in order to reduce deleterious effects caused by daisy chaining high-speed logic signals. Lines 93 and 94 represent the successful demodulation and decoding of a high-rate residual-carrier signal. Differential line pair 49 carries the 4-ary decoder's final clock to line drivers 47 and 48 whose clock outputs are available to assist subsequent digital logic in extracting information from the recovered data stream.

SIMULATION RESULTS

Figure 18:
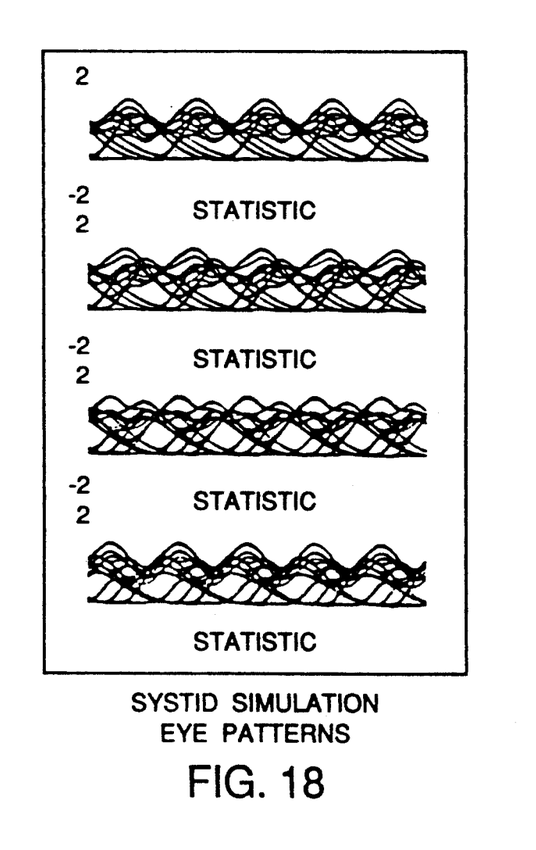
FIG. 18 depicts Systad simulated eye patterns.
Figure 19:
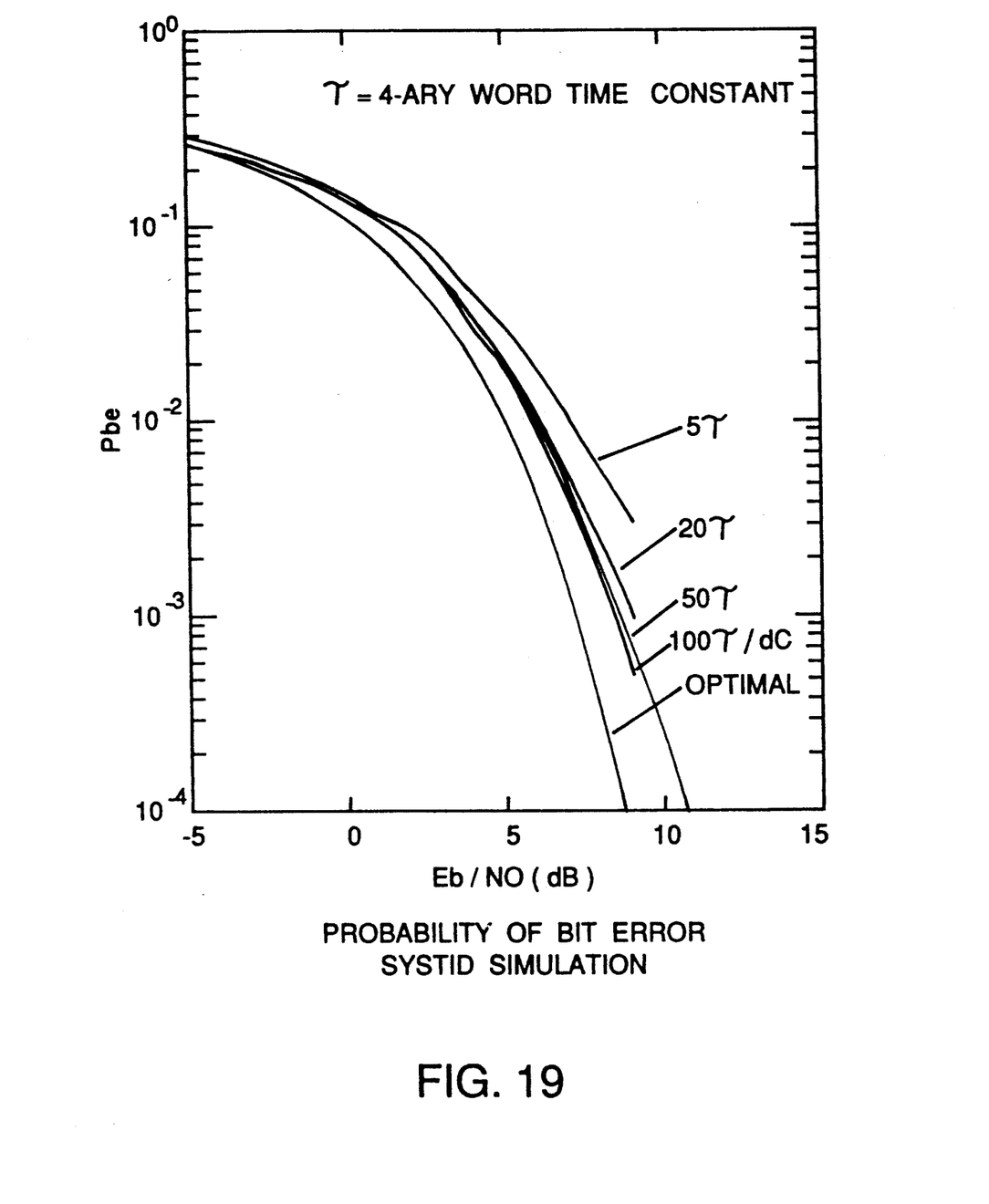
FIG. 19 depicts the probability of the bit eror Systid simulation.

A simulation program, written in SYSTID, has been used to simulate the circuit drawn in block-diagram form as FIG. 3. Of FIG. 18, the top row, the second, row, the third row, and the fourth row of eye patterns are SYSTID results that stimulate the eye patterns as they occur on lines 38 through 41, respectively. As a cross check, it is worth nothing that the top row of FIG. 18 agrees with the results of FIG. 17, results of simulations employing independent methods. The bit error curve, FIG. 19, shows acceptable implementation loss from the ideal (optimal). FIG. 19 also demonstrates that ac-coupling of 100 time constants (a simple task) achieves the same results as if dc coupling were employed.

It will be apparent to persons skilled in the art that this invention is adaptable to various modifications and adaptations. It is intended, therefore that the scope of the invention be limited only by the following claims as read in the light of the prior art.

What is claimed is:

1. In a 4-ary spread spectrum receiver, a despreading system for demodulating a coherent 4-ary transmitted IF signal modulated by a stream of unknown 4-ary words, said transmitted signal having a known spreading rate (PN code), the receiver comprising:
a first mixer (2), said modulated IF signal being applied to one input (1) of said first mixer;
a PN code generator (5), said PN code generator providing a locally-generated PN code and a continuous locally-generated stream of known first, second, third and fourth 4-ary words, said locally-generated stream of known 4-ary words being coherently aligned with the modulations on said transmitted IF signal, said locally-generated stream being applied to a second input (4) of said first mixer, whereby the output of said first mixer (2) comprises said despread IF modulated by 4-ary words of unknown identity;
said PN code generator (5) also having four outputs, one for each of first, second, third and fourth known 4-ary words;
a first group (26-29) of first, second, third and fourth mixers, each having first and second inputs and an output, said first, second, third and fourth 4-ary words from said PN generator being applied to the first input of each of said first, second, third and fourth mixers (26-29), respectively, a coherent, unmodulated IF being applied to each of said second inputs of said first group, whereby the outputs of said mixers of said first group each comprises an IF modulated with a respective one of said 4-ary words;
a second group (12-15) of first, second, third and fourth mixers, each having first and second inputs and an output, the output of the first mixer (2)

being applied to each of the first inputs of said second group of mixers, the respective output of said first, second, third, and fourth mixers of said first group being applied to the second inputs of the first, second, third, and fourth mixers, respectively, of said second group, whereby the second outputs of each of the mixers of said second group each comprises a baseband signal, the result of phase information derived by correlating unknown 4-ary words with one of the four locally generated known 4-ary words;

means for removing the alternating current carrier components from the IF outputs of said second group of mixers, leaving only the resultant DC baseband signals derived by correlating the known and the unknown 4-ary words; and means for determining the sum of the resulting DC voltages, the maximum resultant DC voltage during any given time period being determinative of the identify of the unknown word occurring during a given time period.

2. The receiver as defined in claim 1, wherein said PN code generator also provides a first sampling clock, each cycle of said sampling clock having a duration equal to the length of one 4-ary word; and wherein said given time period is the time between each clock pulse.

3. The receiver as defined in claim 1 wherein said means for determining the sum of the DC voltages comprises means for integrating said DC voltages during each of said periods, the theoretical output of the mixer having a known word matching an unknown word thereby providing the identity of the unknown word.

4. In a-4-ary system in which four possible 4-ary words are transmitted in a timed sequence in a continuous stream, the identity of said words being unknown, means for identifying each of said unknown words, the receiver comprising:

means for generating first, second, third and fourth continuous streams of four known 4-ary words, said streams having the same timed sequence as the transmitted stream;

means during each interval of a 4-ary word for comparing the DC component each of said first, second, third and fourth continuous streams of known words with DC component of the unknown words in said transmitted stream, the known 4-ary word which is in phase with the received unknown 4-ary word being determinative of the identify of said unknown word.

5. In a 4-ary system in which four possible 4-ary words are transmitted in a timed sequence in a continuous stream, the identity of said words being unknown, means for identifying each of said unknown words, and wherein said transmitted continuous stream of four possible 4-ary words are modulated onto an IF carrier;

means for generating first, second, third and fourth continuous streams of four known 4-ary words, said streams having the same timed sequence as the transmitted stream;

means during each interval of a 4-ary word for comparing the DC component of each of said first, second, third and fourth continuous streams of known words with DC component of the unknown words in said transmitted stream, the known 4-ary word which is in phase with the received unknown 4-ary word being determinative of the identity of said word, the means for comparing the DC component of each of said first, second, third and fourth continuous stream of known words with the DC component of the unknown words comprising first, second, third and fourth mixers, each of said mixers having first and second inputs, said modulated carrier being applied to the first of each of said inputs;

the first continuous stream of four known 4-ary words being applied to the first input of said first mixer, the second continuous stream of four known 4-ary words being applied to the first input of said second mixer, the third continuous stream of four known 4-ary words being applied to the first input of said third mixer, the fourth continuous stream of four known 4-ary words being applied to the first input of said fourth mixer.

6. The combination as defined in claim 5, and means in the output of each of said mixers for removing the AC components, whereby first, second, third and fourth DC voltages result; and means for determining which one of the first, second, third or fourth DC voltages contains in phase components of said known and unknown words.

* * * * *